United States Patent [19]
Morse et al.

[11] 3,796,468
[45] Mar. 12, 1974

[54] ELECTRO-PNEUMATIC CONTROL SYSTEM

[75] Inventors: Robert J. Morse; Robert D. Krieder; Brian C. Deem, all of Elyria, Ohio

[73] Assignee: Bendix-Westinghouse Automotive Air Brake Company, Elyria, Ohio

[22] Filed: Apr. 16, 1971

[21] Appl. No.: 134,572

[52] U.S. Cl.......................... 303/15, 303/20, 303/40
[51] Int. Cl............................................. B60t 13/68
[58] Field of Search.............. 303/2, 3, 6, 7, 13, 15, 303/40, 20; 188/3

[56] References Cited
UNITED STATES PATENTS

| | | | |
|---|---|---|---|
| 3,402,972 | 9/1968 | Cooper et al. | 303/20 |
| 3,507,542 | 4/1970 | Cannella | 303/3 |

*Primary Examiner*—Duane A. Reger
*Attorney, Agent, or Firm*—Ken C. Decker; William N.

[57] ABSTRACT

An electro-pneumatic braking system is disclosed for use on an air-braked vehicle. A conventional operator-operated brake control valve controls a relay valve which controls at least some of the brake actuators carried by the vehicle. An electronic control device compares the fluid pressure level at the delivery port of the brake control valve and at the brake actuators controlled by the relay valve. If the fluid pressure level at the delivery port of the brake control valve exceeds the pressure level at the brake actuators by more than a predetermined amount, a first error signal is generated which actuates a solenoid valve that causes the relay valve to initiate a brake application. If the pressure level at the brake actuators exceeds the pressure level at the delivery port of the brake control valve by more than a predetermined amount, a second error signal is generated which actuates a second solenoid valve that releases the relay valve, thereby also releasing the brakes of the vehicle.

18 Claims, 4 Drawing Figures

INVENTORS
ROBERT J. MORSE,
ROBERT D. KRIEDER
& BRIAN C. DEEM
BY Ken C. Decker
ATTORNEY 3,796,468

ELECTRO-PNEUMATIC CONTROL SYSTEM

BACKGROUND OF THE INVENTION

This invention relates to an electro-pneumatic braking system for an air-braked vehicle.

Conventional air brake systems employ an operator-operated brake control valve which actuates one or more relay valves that communicate their associated brake actuators with an air reservoir. Since pressure impulses are propagated at the speed of sound in the control air line which extends between the brake control valve and the relay valve, the rear brakes of the vehicle which are actuated by the relay valve are applied after the front brakes are applied. While in shorter vehicles this time delay is so small that it is insignificant, in longer vehicles, such as tractor-trailer combinations, the time delay may be long enough to detrimentally affect braking performance. The problem is particularly acute in so-called "turnpike trains" which may consist of two or more tailers pulled by a single power unit. Therefore, it is desirable to electrically propagate a control signal from the brake control valve to the relay valve which actuates the brakes of the vehicle.

SUMMARY OF THE INVENTION

Therefore, an important object of our invention is to decrease the time delay between actuation of the brake control valve of an air-braked vehicle and application of the vehicle's brakes.

Another important object of our invention is to electrically propagate a control signal between the brake control valve and the relay valve.

A further object of our invention is to provide electronic control circuitry which actuates the relay valve of the system if the pressure level at the brake control valve differs from the pressure level at the relay valve by more than a predetermined amount.

A still further object of our invention is to provide fail-safe circuitry for detecting a malfunction in the control circuitry and actuating an appropriate warning device mounted in the operator's compartment of the vehicle.

A still further object of our invention is to provide an electro-pneumatic braking system which reverts to straight air operation when the electronic control portion of the system malfunctions.

DETAILED DESCRIPTION

Figure 1:
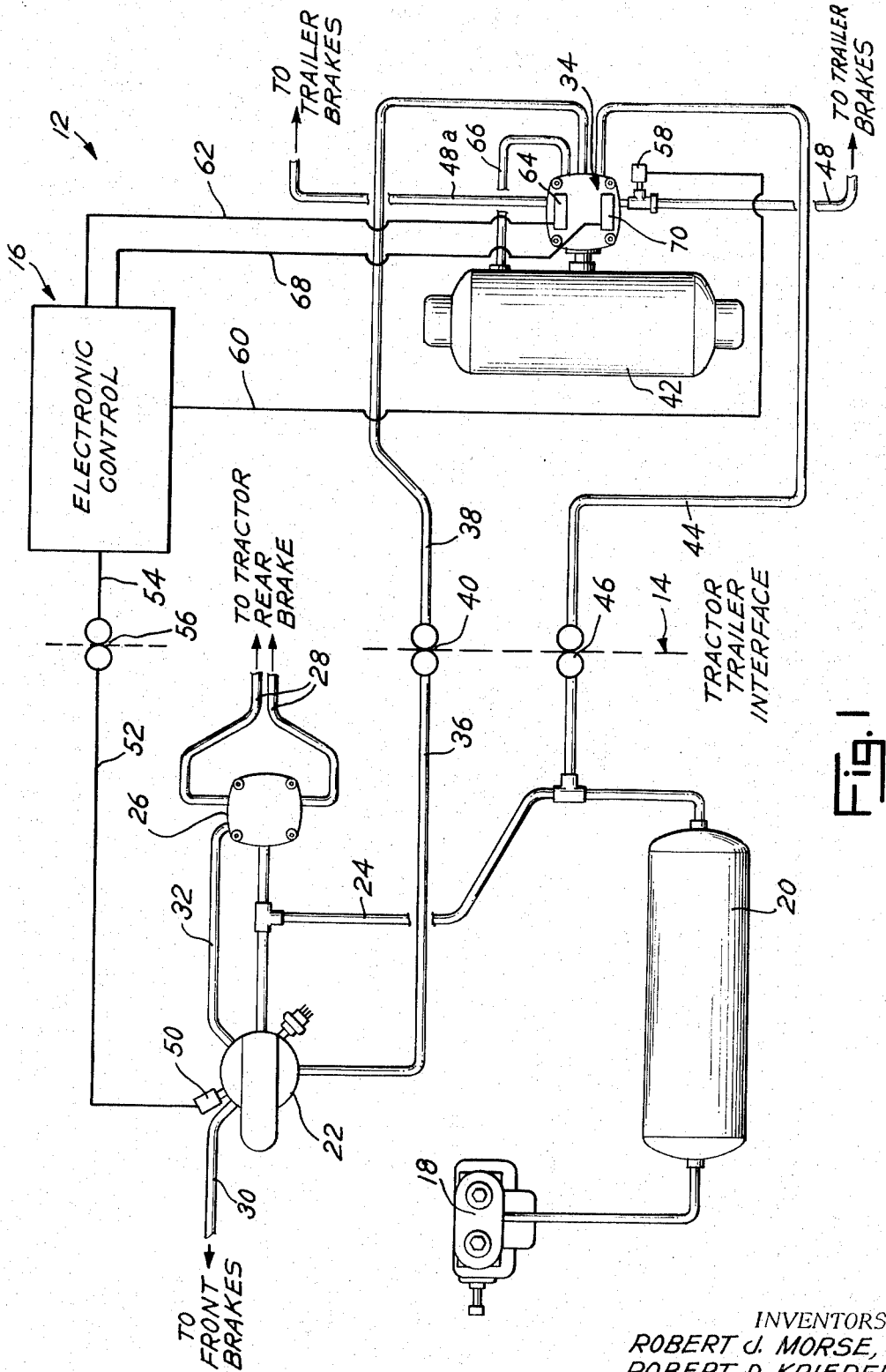
FIG. 1 is a schematic illustration of the air and electronic circuits of an electro-pneumatic braking system for a combination tractor-trailer vehicle made pursuant to the teachings of our present invention.

Referring now to FIG. 1 of the drawing, an electro-pneumatic braking system for use on a tractor-trailer combination vehicle is disclosed. The portion of the system normally carried by the tractor portion of the vehicle is indicated generally by the numeral 10 and the portion of the system normally carried on the trailer portion of the vehicle is indicated generally by the numeral 12. The interface between the tractor and the trailer portions of the system is indicated generally by the dashed line 14. The system includes an electronic control unit indicated generally by the numeral 16 which may be carried on either the tractor or the trailer portion of the vehicle; however, the electronic control unit 16 is illustrated in FIG. 1 as being carried by the trailer.

The portion of the braking system carried by the tractor includes a standard air compressor 18 which is powered by the engine of the vehicle. The air compressor 18 compresses atmospheric air to charge air reservoir 20. The reservoir 20 is communicated to the inlet of a standard operator-operated brake control valve 22 by a conduit 24. The conduit 24 also communicates the reservoir 20 with the supply port of a standard air relay valve 26 of a type well known to those skilled in the art. When a brake application is effected, the relay valve 26 communicates air from the reservoir 20 to the rear brakes of the tractor through conduits 28. The outlets of the brake control valve 22 are communicated to the front brakes of the tractor through conduit 30, to the service port of the relay valve 26 through conduit 32 and to the service port of a second relay valve 34 carried by the trailer through conduits 36 and 38 which are joined together at the tractor-trailer interface by an appropriate coupling 40. The compressed air is also communicated from the reservoir 20 to a second reservoir 42 carried by the trailer through a conduit 44 which is coupled to a branch of the conduit 24 at the tractor-trailer interface by an appropriate connector 46. The delivery section of the relay valve 34 is communicated to the trailer brakes by conduits 48 and 48a. As is well known to those skilled in the art, when the vehicle operator effects a brake application upon operation of the brake valve 22, pressurized air from the reservoir 20 is communicated to the front brake actuators through the conduit 30, to the service port of the relay valve 26 through conduit 32, and to the service port of the relay valve 34 through the conduits 36 and 38. Relay valves 26 and 34 are thereby operated to communicate pressurized air from the reservoirs 20 and 42 to the tractor and trailer brake actuators.

A pressure transducer 50 is communicated to the brake valve 22 and produces an output which is proportional to the pressure level developed at the brake control valve 22 when a brake application is effected. The output of the pressure transducer 50 is transmitted to the electronic control unit 16 through leads 52 and 54 which are joined together at the tractor-trailer interface by an appropriate connector 56. A second pressure transducer 58, which may be identical to the transducer 50, generates an output proportional to the pressure level developed at the delivery ports of the relay valve 34. The output of the transducer 58 is transmitted to the electronic control unit 16 through the lead 60. The transducers 50 and 58 may be of the piezo-resistive type. A lead 62 transmits the output signal of the electronic control unit 16 to a solenoid valve 64 carried by the relay valve 34. The solenoid valve 64 controls communication between the reservoir 42 and the primary chamber of the relay valve 34 through a conduit 66 in a manner more completely described hereinafter. A lead 68 connects a second output of the control unit 16 with a second solenoid valve 70 carried by the relay valve 34 which controls fluid communication between the primary chamber of the latter and the atmosphere.

Figure 3:
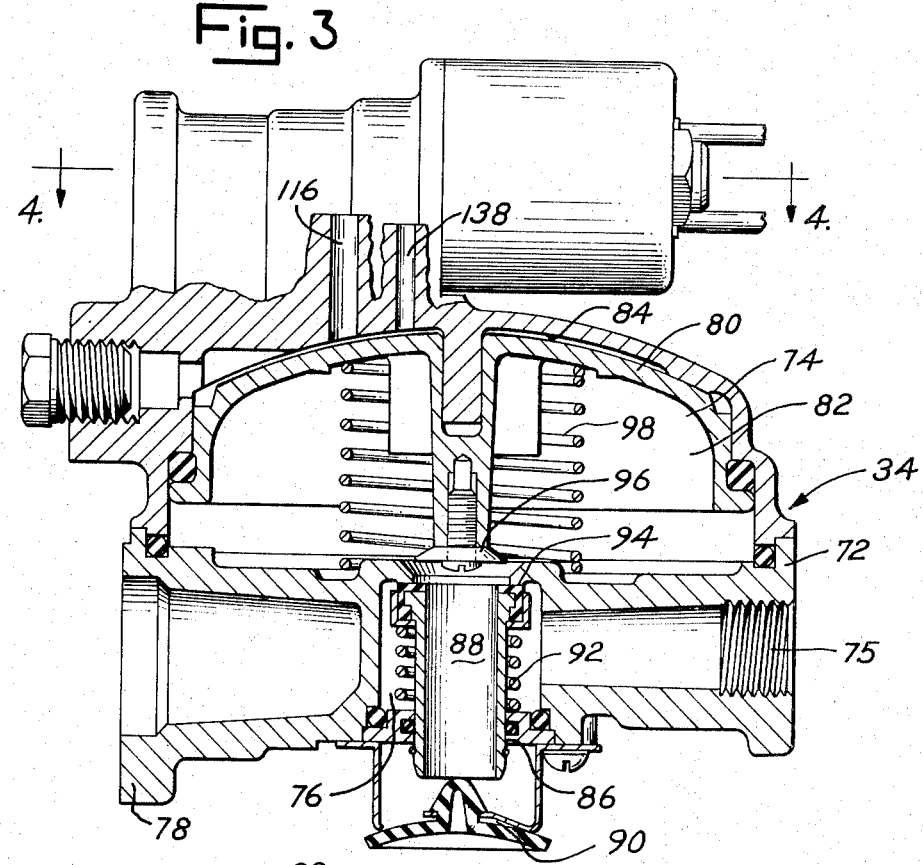
FIG. 3 is a partial cross-sectional view of the relay valve used in the braking system illustrated in FIG. 1.
Figure 4:
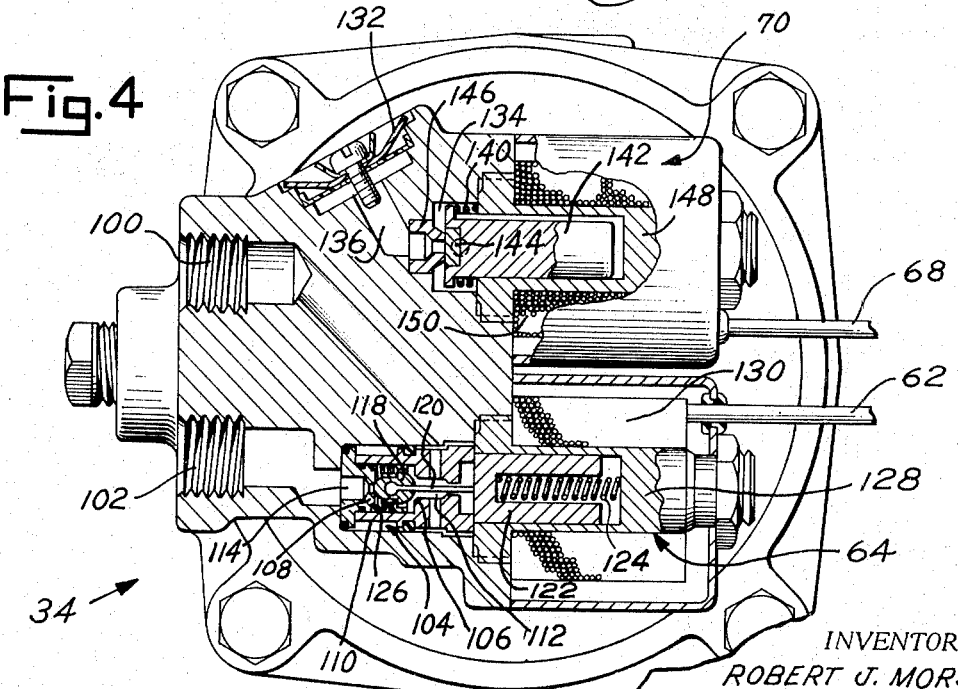
FIG. 4 is a partial cross-sectional view taken substantially along line 4—4 of FIG. 3.

Referring now to FIGS. 3 and 4, the relay valve 34 includes a housing 72 defining a chamber 74 therewithin. The housing 72 is provided with a supply port 75 which is communicated with the conduit 44. The port 75 is communicated to an intermediate chamber 76 which in turn is communicated to the reservoir 42. A flange 78 on the housing 72 secures the relay valve 34 to a suitable mounting boss provided on the reservoir 42.

A piston 80 is slidably mounted in the chamber 74 and divides the latter into a delivery section 82 and a primary section 84. An annular valve member 86 defines a passage 88 therewithin which normally communicates the delivery chamber 82 with the atmosphere through an exhaust port 90. A spring 92 yieldably urges the valve member 86 into sealing engagement with the annular valve seating area 94 provided on the housing 72 to thereby prevent fluid communication between the intermediate chamber 76 and the delivery chamber 82. The piston 80 includes a valve operating portion 96 which is adapted to operate the valve member 86. A spring 98 yieldably urges the piston 80 and therefore the valve operating portion 96 away from the valve member 86. As is well known to those skilled in the art, delivery ports (not shown) communicate the delivery chamber 82 with the conduits 48 and 48a, which communicate relay valve 34 with the trailer brake actuators.

Relay valve 34 is further provided with a service port 100, which is communicated to the brake valve 22 by the conduits 36 and 38, and a second supply port 102 which is communicated to the reservoir 42 by the conduit 66. Each of the ports 100 and 102 is communicated with a valve compartment generally indicated by the numeral 104 within the housing 72. Valve seats 106 and 108 divide the compartment 104 into a central section 110 and a pair of end sections 112 and 114. As is illustrated in FIG. 4, the service port 100 is communicated with the end section 112 and the supply port 102 is communicated with the end section 114. A passage 116 communicates the central section 110 with the primary section 84 of the chamber 74. A valve member 118 is slidably mounted in the central section 110 and is provided with a valve operating stem 120 which extends through the valve seat 106 to engage the end of an armature 122 which forms a part of the solenoid valve 64. A spring 124 yieldably urges the armature 122 to the left viewing FIG. 4, and another spring 126 yieldably urges the valve member 118 toward the valve seat 106. However, since the spring 124 is stronger than the spring 126, the valve member 118 is normally maintained in sealing engagement with the valve seat 108 and flow of air is permitted through the valve seat 106. The solenoid valve 64 further includes a pole piece 128 and an electrical coil 130. As is well known to those skilled in the art, when a current is passed through the coil 130, the armature 122 will be moved to the right viewing FIG. 4, against the bias of the spring 124, thereby permitting the spring 126 to urge the valve member 118 away from the valve seat 108 and into sealing engagement with the valve seat 106.

Relay valve 34 further includes a second exhaust port 132 which is communicated to a valve chamber 134 by a conduit 136. The chamber 134 is also communicated with the primary chamber 84 by a passage 138. A spring 140 yieldably urges an armature 142 which is a part of the solenoid valve 70, to the left viewing FIG. 4. The armature 142 carries a valve member 144 which is urged into sealing engagement with valve seat 146 by the spring 140 to normally prevent fluid communication between the conduit 136 and the valve chamber 134. The solenoid valve 70 further includes a pole piece 148 and coil 150. As is well known to those skilled in the art, when an electrical current is passed through the coil 150, the armature 142 is urged to the right viewing FIG. 4, thereby permitting fluid communication from the chamber 134 into the conduit 136 and through second exhaust port 132 to atmosphere.

Figure 2:
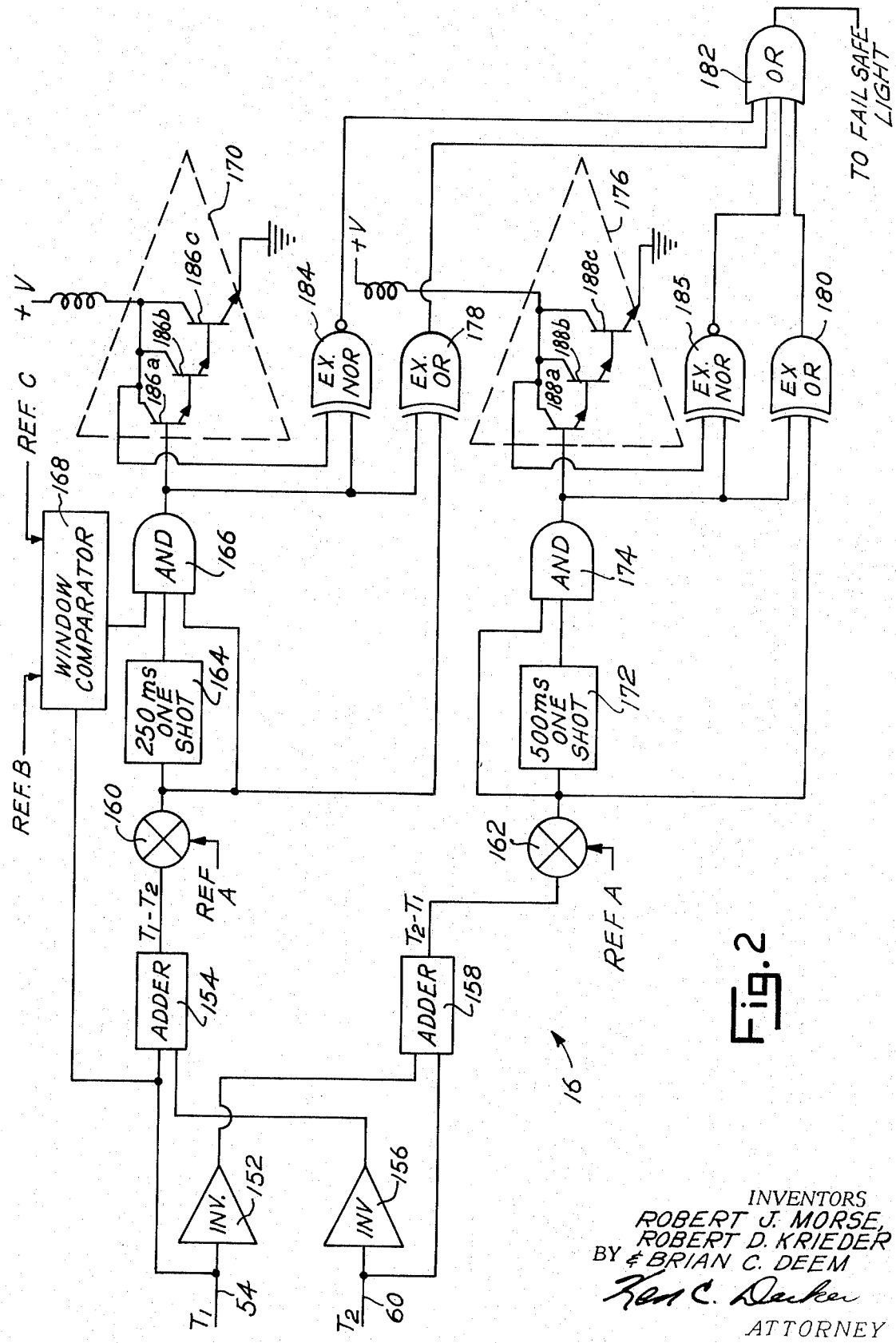
FIG. 2 is a logic diagram of the electrical circuitry for the electronic control unit used in the electro-pneumatic system illustrated in FIG. 1.

Referring now to FIG. 2, the circuitry included within the electronic control unit 16 will now be described in detail. The input $T_1$ from the transducer 50 is fed into an inverter 152 and is also fed into an adder 154. Similarly, the input $T_2$ from the transducer 58 is fed into inverter 156 and also into an adder 158. The output of the inverters 152 and 156 are fed into the input of the adders 158 and 154, respectively, so that the output of the adder 154 is equal to the quantity $T_1$ minus $T_2$ and the output of the adder 158 is equal to the quantity $T_2$ minus $T_1$. The output of the adder 154 is fed into the input of a comparator 160 which compares the quantity $T_1$ minus $T_2$ to some reference value. The reference voltage A is ideally representative of a 5 psi pressure level. Therefore, the pressure at the brake control valve 22 must exceed the pressure in the conduits 48 and 48a by at least 5 psi before the trailer brakes are actuated by the electronic control. Similarly, the output $T_2$ minus $T_1$ is compared to a reference level in a comparator 162. The reference level used in the comparator 162 is ideally also approximately 5 psi. The output of the comparator 160 triggers a 250 millisecond one-shot 164, the output of which is connected to one of the inputs of an AND gate 166. The output of the comparator 160 is also fed to the AND gate 166. The third input of the AND gate 166 is connected to the output of a window comparator 168 which compares the input $T_1$ with two reference levels B and C. The reference level B is proportional to approximately a 3 psi pressure level to assure that the vehicle operator has made the brake application. The reference level C is proportional to a pressure level of approximately 150 psi to assure that a malfunction in the control system has not resulted in a completely unreasonable input $T_1$. The output of the AND gate 166 activates a power amplifier 170 which drives the solenoid valve 64. Since the output of the AND gate 166 terminates after the one-shot 164 times out, the solenoid valve 64 can be actuated for a maximum of 250 milliseconds. This is a sufficiently long time period to assure that the pressure in the primary chamber 84 will become equal to the pressure level at the brake valve 22, but prevents a malfunction in the electronic control unit from actuating the brakes of the trailer for an indefinite period. Similarly, the output of the comparator 162 is connected to the input of a 500 millisecond one-shot 172, the output of which is connected to an input of AND gate 174. The output of the comparator 162 is also connected directly to the AND gate 174. The output of the AND gate 174 is connected to a power amplifier 176 which drives the solenoid valve 70 which exhausts the relay valve 34, thereby relieving the trailer's brakes. The AND gate 174 produces an output only until the one-shot 172 times out so that the relay valve 34 is exhausted for a maximum of 500 milliseconds thereby preventing a malfunction in the electronic control unit 16 from exhausting the trailer's brakes for an indefinite time period.

To indicate a failure in the electronic control unit 16 or in the transducers 50 and 58, exclusive OR gates 178 and 180 are used. One input of the exclusive OR gate 178 is connected to the output of the comparator 160 and another input of the exclusive OR gate 178 is connected to the output of AND gate 166. The output of exclusive OR gate 178 is connected to an input of an OR gate 182, the output of which actuates a fail-safe light in the operator's compartment of the vehicle. If the output of the comparator 160 is different from the output of the AND gate 166, a failure exists and the exclusive OR gate 178 and the OR gate 182 actuate the fail-safe light. Similarly, one input of the exclusive OR gate 180 is connected to the output of the comparator 162 and the other input of the exclusive OR gate 180 is connected to the output of AND gate 174. If the output of the comparator 162 is different from the output of the AND gate 174, a failure exists and the exclusive OR gate 180 and the OR gate 182 turn on the fail-safe light.

Exclusive NOR gates 184 and 185 indicate a failure in the power transistors 186a, 186b, or 186c which are included in the power amplifier 170 and the transistors 188a, 188b, and 188c which are included within the power amplifier 176, respectively. One of the inputs of the exclusive NOR gate 184 is connected to the base of the transistor 186a and the other input of the exclusive NOR gate 184 is connected to the collector of the transistor 186a. If the two inputs to the exclusive NOR gate 184 are the same, a failure exists and the exclusive NOR gate 184 and the OR gate 182 turn on the fail-safe light. Similarly, one of the inputs to the exclusive NOR gate 185 is connected to the base of the transistor 188a and the other input of the exclusive NOR gate 185 is connected to the collector of the transistor 188a. If the two inputs of the exclusive NOR gate 185 are the same, a failure exists and the exclusive NOR gate 185 cooperates with the OR gate 182 to turn on the warning device in the vehicle operator's compartment.

MODE OF OPERATION

When a brake application is effected, the vehicle operator operates the brake control valve 22 to operate the front brakes of the vehicle and also to operate the relay valve 26 which operates the rear brakes of the tractor. The pressure level at the delivery port of the brake valve 22 is sensed by the transducer 50 and is transmitted to the control unit 16. When the pressure level at the brake valve 22 is increased to obtain a level of approximately 5 psi above the level of the output of the relay valve 34, the comparator 160 produces an output signal which is fed through the AND gate 166 which in turn actuates the power amplifier 170 to actuate the solenoid valve 64. When this occurs, the armature 122 of the solenoid valve 64 is urged to the right viewing FIG. 4, thereby permitting the spring 126 to urge the valve member into sealing engagement with the valve seat 106, thereby terminating fluid communication between the service port 100 and the primary chamber 84. Simultaneously, the other end of the valve member 118 moves away from the valve seat 108 permitting air to flow from the reservoir 42 into the primary section 84 through the passage 116. Air in the primary section 84 forces the piston 80 downwardly against the bias of the spring 98.

As the piston 80 moves, the valve operating member 96 first engages the valve member 86 to terminate the communication between the delivery section 82 and the exhaust port 90. Thereafter, further movement of the piston 80 urges the valve member 86 away from the valve seat 94 to permit high pressure air in the reservoir 42 to be communicated into the delivery section 82. As mentioned hereinabove, the high pressure air in the delivery section 82 is communicated to the trailer brake actuators through delivery ports (not shown) in the relay valve 34 and through the conduits 48 and 48a. When sufficient air pressure is communicated to the trailer brake actuators such that the transducer 58 senses a pressure which is approximately 5 psi below that being sensed by transducer 50, the output of the comparator 160 terminates, thereby turning off the power amplifier 170 to thereby release the solenoid valve 64, to permit the valve member 118 to be returned to the position illustrated in FIG. 4. Thereafter, air communicates through the conduits 36 and 38 until normal braking pressure balance is achieved.

When the vahicle operator releases the brake control valve 22, such that the pressure transducer 50 senses a pressure in the brake control valve 22 which is approximately 5 psi below the pressure sensed by the transducer 58, the comparator 162 and AND gate 174 produce an output which actuates the power amplifier 176. Power amplifier 176 drives the solenoid valve 170 which urges the armature 142 carrying valve 144 away from the valve seat 146 to permit the primary section 84 to exhaust through the exhaust port 132 through the passage 138, chamber 134, and conduit 136. When this occurs, the spring 98 urges the piston 80 toward the position illustrated in FIG. 3, thereby reclosing valve member 86 against the valve seat 94 to prevent communication of supply air into the delivery chamber 82 and to permit the delivery chamber 82 to exhaust to atmosphere through the exhaust port 90. Since the brake actuators are communicated to the delivery chamber 82, the brakes of the vehicle will thereby be released.

It should be noted that the relay valve 34 will operate as a standard relay valve when the pressure levels between the brake valve 22 and relay valve 34 are within predetermined limits or when the electronic control unit malfunctions, since service air is supplied to the service port 1oo from the brake valve 22 through the conduits 36 and 38. As described above, when the solenoid valve 64 is released, the valve member 118 is urged away from the valve seat 106 and fluid communication is permitted from the service port 100 to the primary chamber 84 through the chambers 112, 110 and the passage 116. The pressure impulses from the brake control valve operates the piston 80 in the normal manner as described above to actuate the trailer brakes. However, pressure impulses are transmitted through the conduits 36 and 38 at the speed of sound, while the electronic control unit and the components operate at substantially the speed of light. Therefore, the time delay between an application of the brake valve 22 by the vehicle operator and application of the trailer brakes will be much less when the electrical control unit is working normally than when the malfunction requires that the relay valve be operated by service air from the brake control valve 22.

We claim:

1. In a vehicle brake actuation system having a fluid pressure source and brake actuators operated by fluid pressure:
   an operator-operated brake control valve communicated with said fluid pressure source;
   first means for generating a first signal proportional to the difference between the pressure levels at said brake control valve and the pressure level delivered to said brake actuators;
   second means for comparing said first signal with a predetermined reference signal and generating a second signal if said first signal is greater than the reference signal and terminating said second signal if the first signal again drops below said reference signal; and
   third means responsive to said second signal for initiating communication between said brake actuators and said pressure source if the pressure level delivered to the brake actuators is less than the pressure level at the brake control valve and venting said brake actuators if the pressure level in the brake actuators is greater than the pressure level at said brake control valve.

2. In a vehicle brake actuation system having a fluid pressure source and brake actuators operated by fluid pressure;
   an operator-operated brake control valve communicated with said fluid pressure source;
   control means for comparing the fluid pressure level at the brake control valve and the pressure level delivered to the brake actuators and generating a first error signal if the pressure level at the brake control valve exceeds the pressure level delivered to said actuators by more than a predetermined amount and terminating said first error signal if the pressure differential of the brake control valve over the brake actuators decreases to a value less than the predetermined amount, said control means including means for generating a second error signal if the pressure level delivered to said brake actuators exceeds the pressure level at said brake control valve by more than a predetermined amount and terminating said second error signal if the pressure differential of the brake actuators over that of the brake control valve decreases to a value less than the predetermined amount; and
   valve means responsive to said first error signal to communicate said brake actuators with said fluid pressure source and responsive to said second error signal to vent said brake actuators.

3. The invention of claim 2:
   said control means including first means for generating a first intermediate signal proportional to the difference between the pressure level at the brake control valve and the pressure level delivered to the brake actuators and second means for generating a second intermediate signal proportional to the difference between the pressure level delivered to said brake actuators and the pressure level at said brake control valve.

4. The invention of claim 3:
   said control means further including a first comparator for comparing said first intermediate signal with a first reference signal and generating said first error signal if the first intermediate signal exceeds the first reference signal and a second comparator for comparing said second intermediate signal with a second reference signal and generating said second error signal if the second intermediate signal is greater than the second reference signal.

5. The invention of claim 3:
   said control means including first pressure responsive means at said brake valve for generating an electrical signal proportional to the pressure level at said brake valve; and
   second pressure responsive means for generating an electrical signal proportional to the pressure level delivered to said brake actuators;
   said electrical signal generated by said first and second pressure responsive means being transmitted to said first means and to said second means.

6. The invention of claim 5:
   said first and second pressure responsive means being piezo-resistive pressure transducers.

7. The invention of claim 2; and
   a relay valve for controlling fluid communication between the pressure source and the brake actuators;

said brake control valve being operable to transmit pressure to said relay valve to actuate the latter to initiate fluid communication between the brake actuators to the pressure source when the brake control valve is applied and to release said relay valve to vent said brake actuators when the brake control valve is released;
   said valve means responding to said first error signal to actuate the relay valve to thereby initiate communication between said brake actuators and the pressure source and to said second error signal to release said relay valve to vent said brake actuators.

8. The invention of claim 7:
   said valve means including a first electrically operated valve responsive to said first error signal to terminate fluid communication between the relay valve and the brake control valve and to initiate fluid communication between the pressure source and the relay valve to actuate the latter to admit fluid pressure to the brake actuators and a second electrically operated valve responsive to said second error signal to release said relay valve to vent said brake actuators.

9. The invention of claim 2:
   a warning device mounted in the operator's compartment of the vehicle; and
   fail-safe means for actuating said warning device when a malfunction prevents satisfactory operation of said control means.

10. The invention of claim 4:
    said control means further including a device responsive to the output of one of said comparators for generating a signal for a predetermined time period, the length of said time period being independent of fluctuations in the value of said error signals and first gating means inhibiting the output of said one comparator after the signal generated by said device expires.

11. The invention of claim 10:
    said control means further including a device responsive to the output of the other comparator for generating a signal for a predetermined time period, the length of said time period being independent of fluctuations in the value of said error signals, and second gating means inhibiting the output of the other comparator after the signal generated by said device expires.

12. The invention of claim 4:
said control means further including a device responsive to the output of said first comparator for generating a signal for a predetermined time period, a window comparator for comparing said first intermediate signal with a pair of reference signals and generating an output signal if the first intermediate signal is greater than one of the reference signals but less than the other reference signal, and gating means inhibiting the output of said first comparator unless said window comparator and said device produces an output signal.

13. The invention of claim 10; and
a warning device mounted in the operator's compartment of the vehicle;
said control means further including means for actuating said warning device if the output of the corresponding gating means is not equal to the output of said one comparator.

14. The invention of claim 11; and
a warning device mounted in the operator's compartment of the vehicle;
said control means further including means for actuating said warning device if the output of said first gating means is not equal to the output of said one comparator and if the output of said second gating means is not equal to the output of the other comparator.

15. The invention of Claim 4:
a warning device mounted in the operator's compartment of the vehicle; and
first and second power amplifiers for amplifying said first and second error signals respectively;
said control means further including means for actuating said warning device when either of said first or second power amplifiers malfunction.

16. In a tractor-trailer breaking system having a fluid pressure source and brake actuators operated by fluid pressure:
a first fluid reservoir carried by said tractor;
a second fluid reservoir carried by said trailer;
a relay valve carried by said trailer for actuating the brake actuators carried by the trailer, said relay valve having a primary section and a delivery section, said primary section being responsive to fluid pressure to cause said delivery section to communicate said second reservoir with the brake actuators carried by the trailer;
electrically operated valve means for controlling fluid communication between said primary section and said second reservoir and between said primary section and the atmosphere;
an operator-operated brake control valve communicated to said first reservoir for actuating the brakes of the tractor and trailer;
control means for comparing the fluid pressure level at the brake control valve and the fluid pressure level at the brake actuators carried by the trailer and generating a first error signal if the pressure level at the brake control valve exceeds the pressure level delivered to said trailer actuators by more than a predetermined amount and generating a second error signal if the pressure level delivered to said trailer brake actuators exceeds the pressure level at said control valve by more than a predetermined amount;
said electrically operated valve means being responsive to said first error signal to communicate said primary section of the relay valve with said second reservoir to thereby cause said delivery section to communicate said second reservoir with the brake actuators carried by the trailer and responsive to said second error signal to vent said primary section to atmosphere to thereby permit said delivery section to also vent said trailer brake actuators to atmosphere.

17. The invention of claim 16:
said brake control valve being communicated to said primary section to actuate said relay valve when a malfunction prevents normal operation of the electrically operated valve means;
said electrically operated valve means terminating fluid communication between the brake valve and the primary section when communication between said second reservoir and said primary section is initiated.

18. In a vehicle brake actuation system having a fluid pressure source and brake actuators operated by fluid pressure:
an operator-operated brake control valve communicated with said fluid pressure source;
control means for comparing the difference between said fluid pressure level at the brake control valve and at said actuators with a first reference value and generating a first error signal if said difference exceeds said reference value and terminating said first error signal when said difference drops below said predetermined amount, said control means comparing the difference between the fluid pressure level at said control valve with a second reference value and generating a second error signal if said last-mentioned difference exceeds said second reference value and terminating said second error signal when said last-mentioned difference drops below said second reference value; and
valve means responsive to said first error signal to communicate said actuators with said fluid pressure source and responsive to said second error signal to vent said actuators.

* * * * *